(12) United States Patent
Snow et al.

(10) Patent No.: US 12,092,082 B1
(45) Date of Patent: Sep. 17, 2024

(54) SYSTEM AND METHOD FOR USE OF AN AUTOMATICALLY TUNABLE SPRING MASS DAMPER TO REDUCE VIBRATIONS IN WIND TURBINE BLADES

(71) Applicant: General Electric Company, Schenectady, NY (US)

(72) Inventors: Logan Sproull Snow, Rotterdam, NY (US); Charles Erklin Seeley, Niskayuna, NY (US); Eladio Clemente Delgado, Burnt Hills, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/352,013

(22) Filed: Jul. 13, 2023

(51) Int. Cl.
  *F03D 80/50* (2016.01)
  *F03D 7/02* (2006.01)
  *F03D 17/00* (2016.01)

(52) U.S. Cl.
  CPC ......... *F03D 7/0298* (2023.08); *F03D 17/015* (2023.08); *F05B 2260/964* (2013.01)

(58) Field of Classification Search
  CPC ...... F03D 1/0675; F03D 1/065; F03D 1/0633; F03D 80/50; F03D 7/0264; F05B 2260/30; F05B 2260/96; F05B 2260/962; F05B 2260/964; F05B 2260/966
  See application file for complete search history.

(56) References Cited

U.S. PATENT DOCUMENTS

| | | | |
|---|---|---|---|
| 7,854,589 B2 | 12/2010 | Nielsen et al. | |
| 8,672,107 B2 | 3/2014 | Ivanco | |
| 9,316,202 B2 | 4/2016 | Bech | |
| 10,161,389 B2 | 12/2018 | Teichert | |
| 10,288,039 B2 * | 5/2019 | Chen | F03D 80/50 |
| 10,619,699 B2 | 4/2020 | Ivanco | |
| 10,718,232 B2 | 7/2020 | Mitsch | |

(Continued)

FOREIGN PATENT DOCUMENTS

| | | |
|---|---|---|
| EP | 3795824 A1 | 3/2021 |
| WO | WO2008/040347 A1 | 4/2008 |

OTHER PUBLICATIONS

Co-Pending U.S. Appl. No. 17/685,473, filed Mar. 3, 2022.

(Continued)

*Primary Examiner* — David E Sosnowski
*Assistant Examiner* — Maxime M Adjagbe
(74) *Attorney, Agent, or Firm* — Dority & Manning. P.A.

(57) ABSTRACT

A system and method are provided for reducing vibrations and loads in one or more rotor blades on a rotor hub of a wind turbine when the rotor hub is in a locked or idling condition. An electronically tunable spring mass damper is attached to a fixed location on one or more of the rotor blades. The spring mass damper is maintained on the rotor blades during the locked or idling condition of the rotor hub. The method includes sensing movement of the mass component resulting from the vibrations induced in the blade. Based on the sensed movement of the mass component, the spring mass damper is automatically tuned to the amplitude of the vibrations by operating the electric machine as a generator in a virtual damper mode and/or tuned to the frequency of the vibrations by operating the electrical machine as a motor-generator in a virtual spring mode.

20 Claims, 7 Drawing Sheets

(56) References Cited

U.S. PATENT DOCUMENTS

| | | |
|---|---|---|
| 11,572,868 B1 | 2/2023 | Seeley et al. |
| 2009/0148289 A1 | 6/2009 | Edenfeld |
| 2020/0209100 A1* | 7/2020 | Christiansen ....... G01M 5/0016 |
| 2020/0284240 A1 | 9/2020 | Mitsch |
| 2021/0079896 A1 | 3/2021 | Herrig et al. |
| 2021/0123415 A1 | 4/2021 | Couturier |
| 2021/0254605 A1 | 8/2021 | Madsen et al. |
| 2022/0126957 A1* | 4/2022 | Johnsen ................ B63B 21/502 |

OTHER PUBLICATIONS

Co-Pending U.S. Appl. No. 17/685,495, filed Mar. 3, 2022.
Bai et al., Design of an Active Damping System for Vibration Control of Wind Turbine Towers, Infrastructures, vol. 6, No. 11, Nov. 2021, 24 Pages. https://doi.org/10.3390/infrastructures6110162; https://www.mdpi.com/2412-3811/6/11/162.

* cited by examiner

SYSTEM AND METHOD FOR USE OF AN AUTOMATICALLY TUNABLE SPRING MASS DAMPER TO REDUCE VIBRATIONS IN WIND TURBINE BLADES

FIELD

The present disclosure relates in general to wind turbine power generating systems, and more particularly to systems and methods for damping vibrations and loads in wind turbines, particularly when the rotor hub is non-operational in a locked or idling condition.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades, wherein the rotation generates a torque that is transmitted through a rotor shaft to a generator, either directly ("directly driven") or through the use of a gearbox. This way, the generator produces electricity which can be supplied to the electrical grid.

There is a trend to make wind turbine blades increasingly longer to capture more wind and convert the energy of the wind into electricity. This results in the blades being more flexible and more prone to aero-elastic instabilities, e.g., vibrations of the blades that can also lead to unstable blade oscillations. Vibrating blades create the risk of major potential damage to various components in the entire wind turbine.

When the wind turbine is in operation, a wind turbine controller may operate (directly or indirectly) an auxiliary drive system, such as a pitch system, or the generator torque to reduce loads on the blades and thus counteract blade vibrations.

However, the problem of aero-elastic instabilities can be serious when the wind turbine is in a stand-still condition, either idling or locked. When the rotor is locked against rotation, for instance due to installation, commissioning, or maintenance tasks, the blades can experience aero-elastic instabilities, including different types of vibrations when angles of attack are within certain ranges. Because the rotor is locked, rotation of the rotor cannot be used to reduce the loads that lead to these vibrations.

At least two types of vibrations may happen during stand-still conditions. The first one is vortex induced vibration (VIV) at certain angles of attack and may or may not include cross flow vortices shed at frequencies close to blade eigen frequencies or system frequencies. The second one is stall-induced vibration (SIV) when the angle of attack is close to stall angles and the flow interaction may lead to blade vibrations. The angle of attack may be understood as a geometrical angle between the flow direction of the wind and the chord of a rotor blade. There may also be cross flow components to the flow.

The vortex and stall induced vibrations are phenomena that, if not adequately designed or compensated for, can lead to blade failure or accelerate blade damage.

A current solution to the cited problems includes the use of aerodynamic devices attached to the blades to reduce vortices and/or increase damping. However, this solution may increase loads due to drag, as well as costs and time for installation and removal of such devices.

Another current practice for wind turbines when not making power includes setting the pitch angle of the rotor blades to substantially 90 degrees when the rotor is yawed into the wind and prevented from rotating by means of a locking pin. This particular pitch angle may reduce loads on the blades, at least with some wind conditions. However, the locking pin may suffer from higher loads when the pitch angle is set at the weathervane position and, even in this position, not all vibrations may be avoided, particularly if the wind direction changes over time.

U.S. Pat. No. 9,316,202 proposes a method and system to guard against oscillations of the wind turbine blades when the rotor is locked or idling at low speeds that involves attachment of a releasable cover to the blades that provides a non-aerodynamic surface for a region of the blade. The blade cover is described as a sleeve of a net-like material that can be positioned on the blade either before installation or in the field by service engineers using guidelines.

The present disclosure provides an alternate effective means to reduce or prevent vibrations or oscillations in the wind turbine blades when the wind turbine is in a non-operational mode with the rotor hub unable to yaw and locked or idling via use of unique vibration dampers that will provide benefits in cost, time and ease of installation, and effectiveness.

BRIEF DESCRIPTION

Aspects and advantages of the invention will be set forth in part in the following description, or may be obvious from the description, or may be learned through practice of the invention.

The present disclosure encompasses a method for preventing or at least reducing vibrations and loads in one or more rotor blades on a rotor hub of a wind turbine when the wind turbine is in a non-operational mode with the rotor hub in a locked or idling condition. This mode of the wind turbine may occur, for example during installation, repair, maintenance, disconnection from a grid, or any other scenario that calls for the rotor hub to be locked against rotation (i.e., at a standstill) or allowed to idle.

The method includes attaching an electronically tunable spring mass damper at a fixed location on the blade during the locked or idling condition of the rotor hub, the tunable spring mass damper having a mass component that moves along a stroke path. The spring mass damper includes an electric machine operable as a motor or a generator. For example, the electrical machine may be a conventional DC motor that can also function as a generator. The method includes determining an amplitude and a frequency of vibrations induced in the blade during the locked or idling condition, as well as sensing movement of the mass component resulting from the vibrations induced in the blade. Based on the sensed movement of the mass component, the damping functionality of the spring mass damper is automatically tuned to regulate the amplitude of the vibrations by operating the electric machine as a generator in a virtual damper mode. Alternatively, or in addition, the spring mass damper stiffness is automatically tuned to the frequency of the vibrations by operating the electrical machine as a motor-generator in a virtual spring mode. In a particular embodiment, both tuning functions are performed.

In a particular embodiment, the spring mass damper includes a flywheel in geared engagement with the electric machine as the mass component moves along the stroke path. In the virtual damper mode the electrical machine generates a counter-torque on the flywheel that is proportional to the spring mass damper velocity as the spring mass damper decelerates towards ends of the stroke path, and in the virtual spring mode the electrical machine generates an additive or counter-torque to the flywheel that is proportional to the spring mass damper position as the spring mass damper accelerates away from the ends of the stroke path. In this embodiment, in the virtual damper mode, the electrical machine operates as a generator and charges a battery. In the virtual spring mode, the electrical machine operates as a motor for one half-cycle of the spring mass damper stroke, and as a generator in the other half cycle of the spring mass damper stroke, similar to the physical kinetic energy behavior of an expanding and contracting spring, with electric machine energy losses supplied by the battery.

The flywheel may be in geared engagement with a track gear that extends along and defines the stroke path such that the flywheel is rotationally driven as the mass component moves along the stroke path. The flywheel is coupled to a shaft that is coupled to the electrical machine.

The method is advantageous in that the step of automatically tuning the spring mass damper is accomplished completely by the spring mass damper without outside operator or device action.

In accordance with certain embodiments, the position or movement of the mass component along the stroke path is sensed continuously or periodically with one or more sensors configured with the spring mass damper. The position data is used for various tuning functions.

Another advantage of the present method is that the spring mass damper is operationally insensitive to temperature changes.

In certain embodiments, the spring mass damper is in communication with a remote central controller, wherein at least one operational parameter of the spring mass damper is remotely adjusted or controlled by the remote central controller. The spring mass damper may also be in communication with a mobile smart device that is, in turn, in communication with the remote central controller, wherein an operator adjusts the operating parameters of the spring mass damper via the mobile smart device or via the remote central controller.

Each blade on the rotor hub of the wind turbine may be configured with one of the spring mass dampers, wherein each of the spring mass dampers is in communication with a wind turbine controller. The wind turbine controller may be in communication with the remote central controller.

The present invention also encompasses a wind turbine configured for reducing vibrations and loads in rotor blades during a non-operational mode. The wind turbine includes a plurality of rotor blades on a rotor hub, wherein in the non-operational mode of the wind turbine, the rotor hub is in a locked or idling condition. The wind turbine further includes a spring mass damper attached at a fixed location on one or more of the rotor blades, the spring mass damper having a mass component that is movable along a stroke path. One or more sensors configured within the spring mass damper to sense movement of the mass component along the stroke path, wherein the movement is generated by vibrations or oscillations induced in the rotor blades during the locked or idling condition of the rotor hub. A controller is used with the spring mass damper and is configured to perform one or both of the following: (a) based on the sensed movement of the mass component, automatically tune the spring mass damper to an amplitude of the vibrations by operating the electric machine as a generator in a virtual damper mode; or (b) automatically tune the spring mass damper to the frequency of the vibrations by operating the electrical machine as a motor-generator in a virtual spring mode.

In a certain embodiment, the spring mass damper is in communication with a remote central controller, wherein one or more operating parameters of the spring mass damper are remotely adjusted or controlled by the remote central controller.

In another embodiment, the spring mass damper may also be in communication with a mobile smart device, wherein an operator adjusts the operating parameters of the spring mass damper via the mobile smart device or via the remote central controller.

Each of the rotor blades of the wind turbine may be configured with one of the spring mass dampers, each of the spring mass dampers in communication with a wind turbine controller that is, in turn, in communication with the remote central controller.

In a particular configuration, the spring mass damper includes a flywheel in geared engagement with the electric machine as the mass component moves along the stroke path, wherein in the virtual damper mode the electrical machine generates a counter-torque proportional to the spring mass damper velocity on the flywheel as the spring mass damper decelerates towards ends of the stroke path, and in the virtual spring mode the electrical machine generates an additive or counter-torque to the flywheel that is proportional to spring mass damper position as the spring mass damper accelerates away from the ends of the stroke path.

In an embodiment, the flywheel may be in geared engagement with a track gear that extends along the stroke path such that the flywheel is rotationally driven as the mass component moves along the stroke path, the flywheel coupled to a shaft that is coupled to the electrical machine.

In another embodiment, the spring mass damper further includes a battery, wherein in the virtual damper mode, the electrical machine operates as the generator and charges the battery, and in the virtual spring mode, the electrical machine operates as a motor or a generator whose losses are supplied by the battery.

The present invention also encompasses a system for reducing vibrations and loads in rotor blades of a wind turbine during a non-operational mode wherein a rotor hub of the wind turbine is in a locked or idling condition. This system includes the spring mass damper configured with the functionalities described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
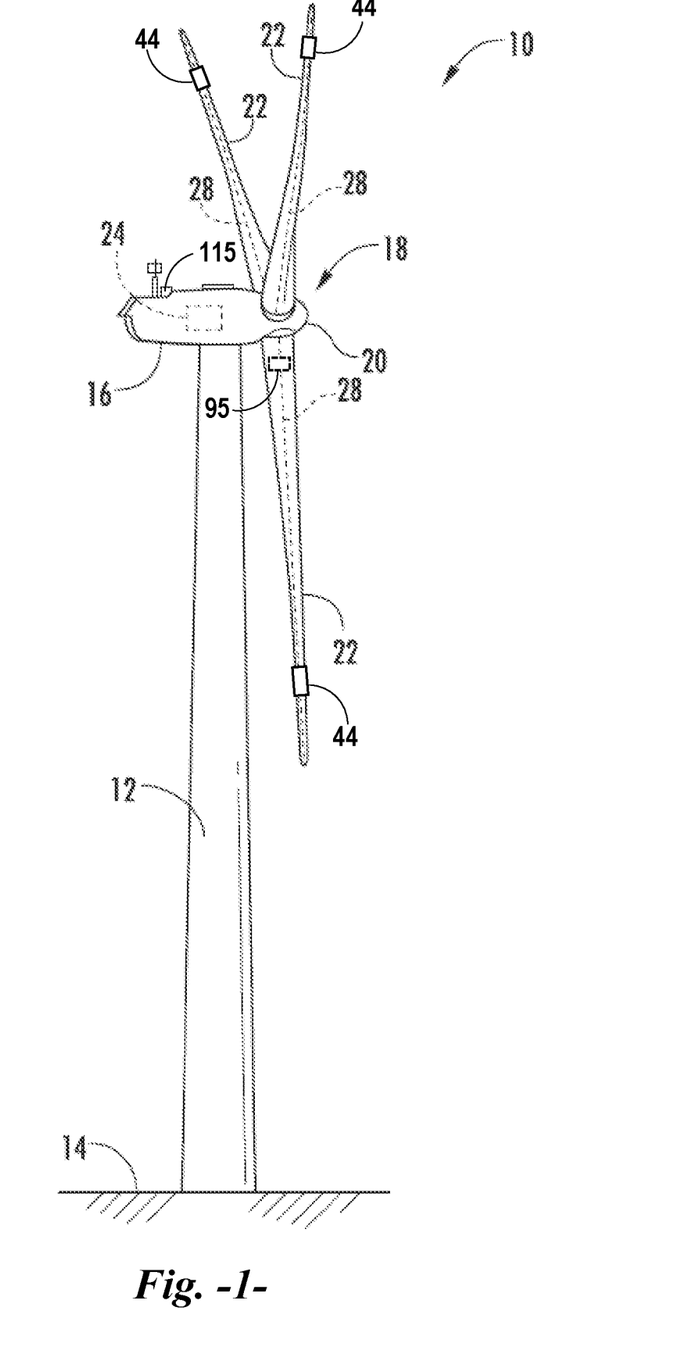
FIG. 1 illustrates a perspective view of a wind turbine.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 positioned within the nacelle 16 to permit electrical energy to be produced.

The wind turbine 10 may also include a wind turbine controller 24 centralized within the nacelle 16. However, in other embodiments, the controller 24 may be located within any other component of the wind turbine 10 or at a location outside the wind turbine 10. Further, the controller 24 may be communicatively coupled to any number of the components of the wind turbine 10 in order to control the operation of such components and/or implement a corrective or control action. For example, the controller 24 may be in communication with individual pitch drive systems associated with each rotor blade 22 in order to pitch such blades about a respective pitch axis 28. As such, the controller 24 may include a computer or other suitable processing unit. Thus, in several embodiments, the controller 24 may include suitable computer-readable instructions that, when implemented, configure the controller 24 to perform various different functions, such as receiving, transmitting and/or executing wind turbine control signals. Accordingly, the controller 24 may generally be configured to control the various operating modes (e.g., start-up or shut-down sequences), de-rating or up-rating the wind turbine, and/or individual components of the wind turbine 10.

The present disclosure relates to situations wherein the wind turbine 10 is non-operational (e.g., not producing electrical power) and the rotor 18 (and thus the rotor hub 20) is either locked against rotation or is left to idle, for instance due to installation, commissioning, maintenance tasks, or any other reason. The controller 24 may remain communicatively coupled to at least the pitch drive system in the locked or idling state of the rotor 18. Alternatively, the "controller" function may also be provided by a separate dedicated controller during the locked or idling state of the rotor. This dedicated controller may be configured to operate autonomously, i.e., independently from the wind turbine controller 24, at least in some operating conditions, and may be able to perform tasks such as receiving and emitting signals and processing data when the wind turbine controller 24 is otherwise unavailable.

The wind turbine 10 of FIG. 1 may be placed in an offshore or onshore location.

As used herein, the term "controller" refers not only to integrated circuits referred to in the art as being included in a computer, but also refers to a microcontroller, a microcomputer, a programmable logic controller (PLC), an application specific integrated circuit, and other programmable circuits. The controller is also configured to compute advanced control algorithms and communicate to a variety of Ethernet or serial-based protocols (Modbus, OPC, CAN, etc.). Additionally, a memory device(s) configured with the controller may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s) 402, configure the controller to perform the various functions as described herein.

Referring again to FIG. 1, each of the rotor blades 22 includes a spring mass damper 44 in accordance with aspects of this disclosure mounted thereon, for example at a fixed location that is closer to the blade tip rather than the blade root.

Figure 2:
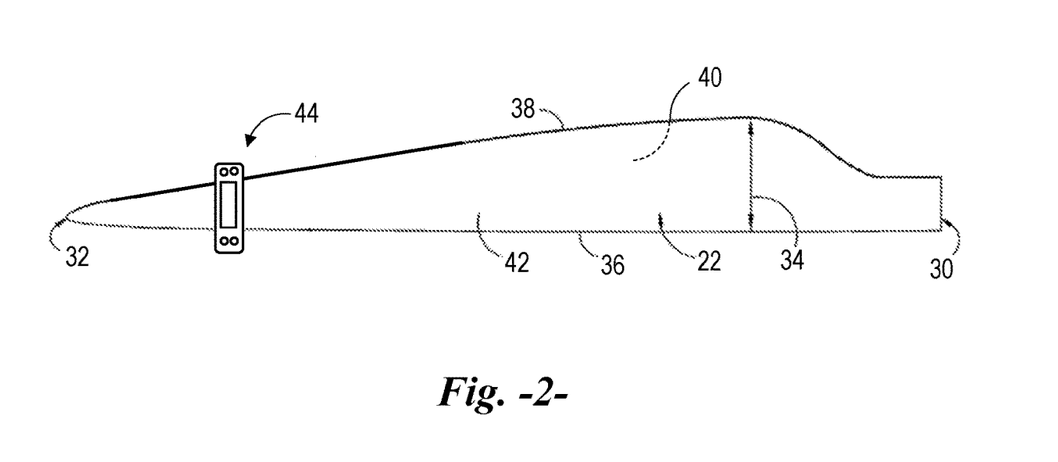
FIG. 2 illustrates a simplified view of a wind turbine blade equipped with a tunable spring mass damper.

FIG. 2 is a diagram view of a conventional rotor blade 22 that includes an opposite blade root 30, leading edge 36, trailing edge 38, suction side 42, and pressure side 40. The chord-wise dimension 34 of the blade 22 is also indicated. The spring mass damper 44 is mounted chord-wise onto the suction side 42 of the blade 22 generally adjacent to the blade tip 32. The spring mass damper could just as well be mounted onto the suction side 42 of the rotor blade 22. The spring mass damper 44 is explained in greater detail below.

Figure 3:
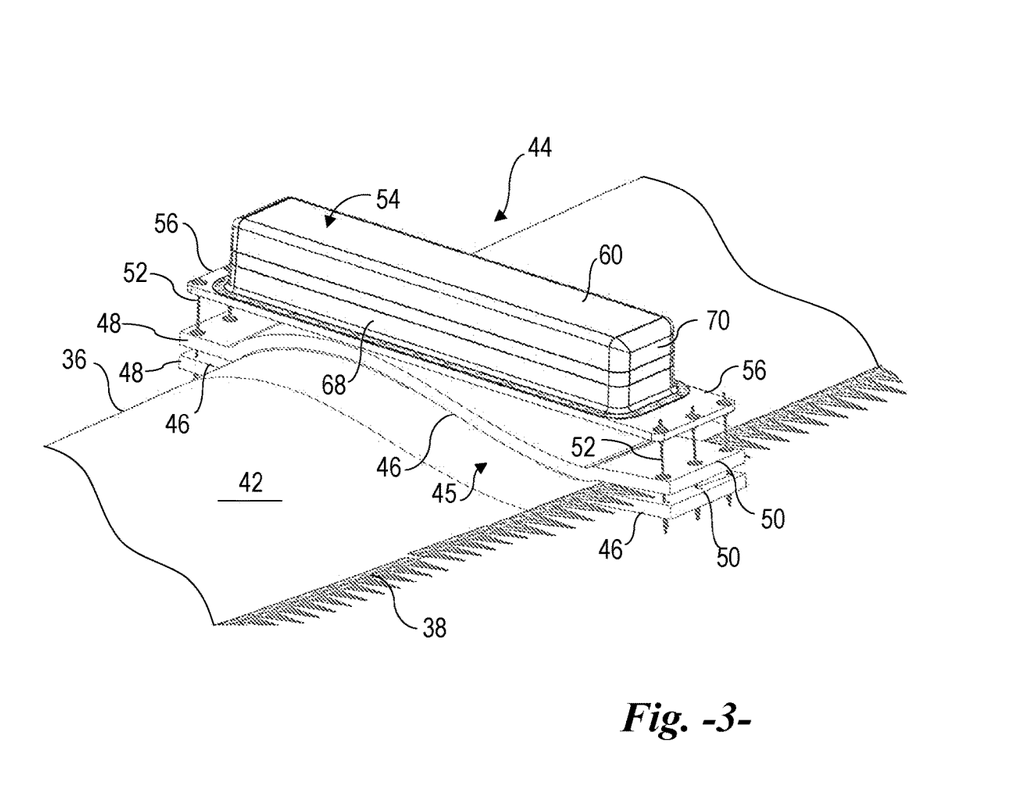
FIG. 3 is a perspective view of a tunable spring mass damper mounted onto a wind turbine blade.

FIG. 3 is a perspective external view of an embodiment of the spring mass damper 44 on the rotor blade 22, and particularly illustrates an embodiment of an attaching system 45 for fixing the spring mass damper on the blade. The attaching system includes opposite clamping shells 46 that conform to the blade's outer pressure side surface 40 and suction side surface 42. The clamping shells 46 extend across the chord-wise width of the rotor blade 22 and include a leading-edge flange 48 and a trailing edge flange 50. The spring mass damper 44 includes a base 56 that extends above one of the clamping shells 46 between the flanges 48, 50. The base 56 is bolted to the flanges with bolts 52, wherein the bolts 52 also serve to bolt the opposite flanges 48 together as well as the opposite flanges 50.

It should be appreciated that the spring mass damper 44 may be mounted to the rotor blade using any suitable nonpermanent attaching system, including mechanical fasteners, adhesives, inflatable devices, and so forth.

The spring mass damper 44 includes a housing 54 mounted onto the base 56, wherein the working components of the spring mass damper 44 are contained within the housing 54, as described in greater detail below. The housing 56 includes side walls 68, end walls 70, and a top 60. It should be appreciated that the housing 56 may have any geometric shape.

Figure 4:
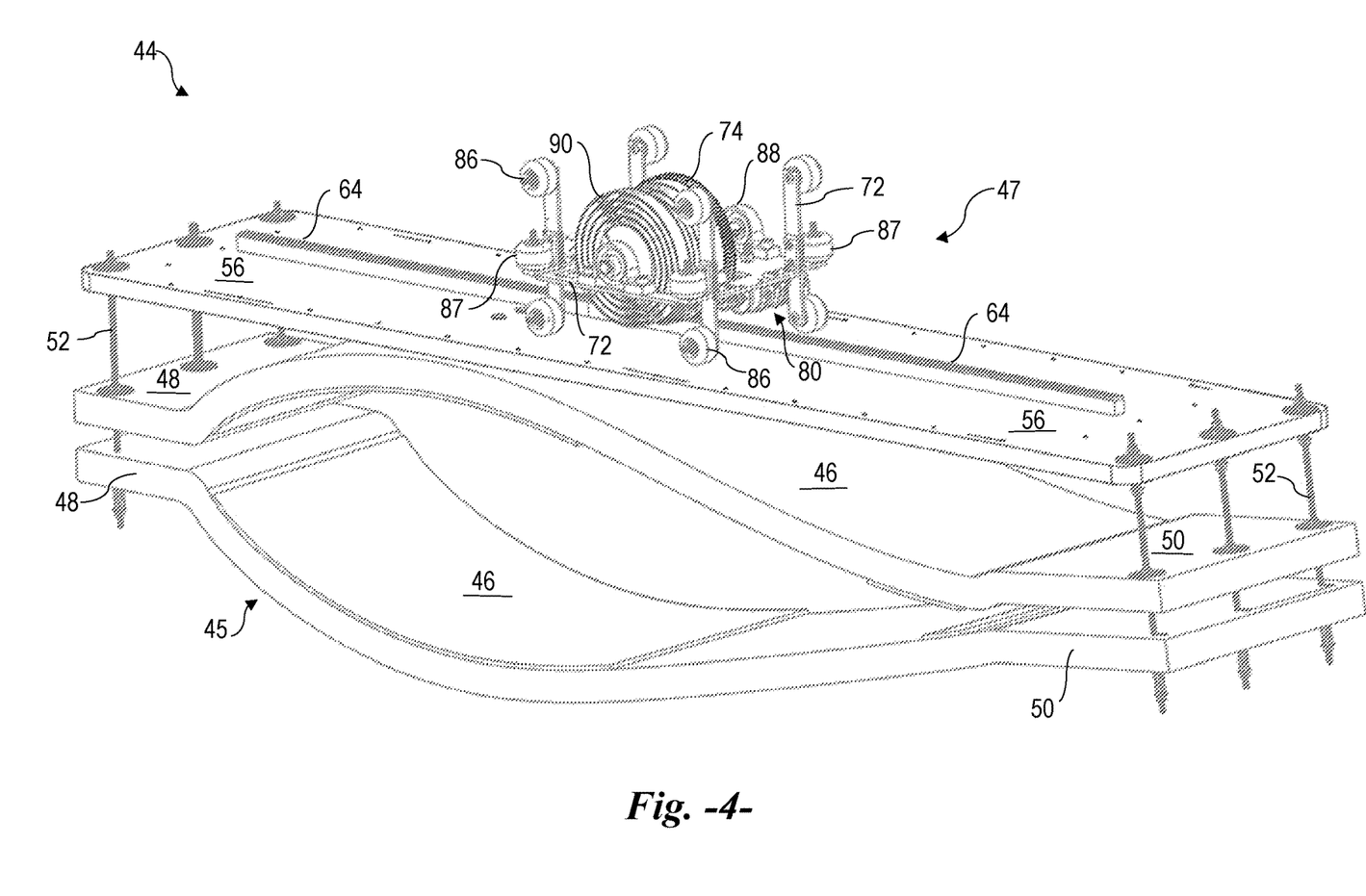
FIG. 4 is a more detailed perspective view of the tunable spring mass damper of FIG. 3.
Figure 5A:
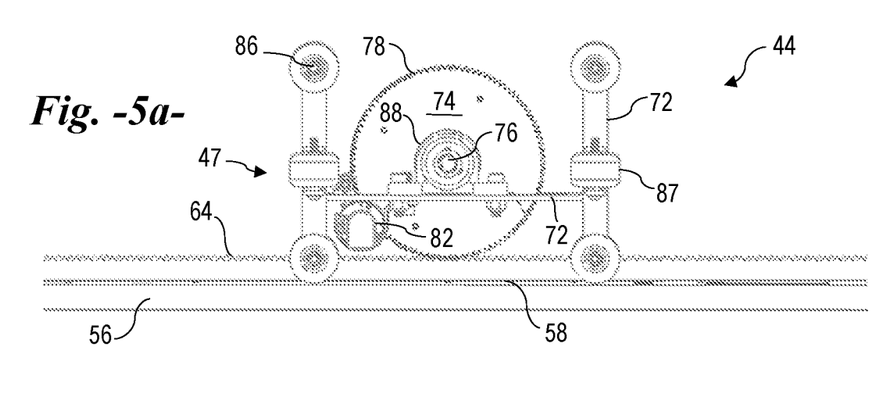
FIG. 5a is a side view of the spring mass damper of FIG. 4.
Figure 5B:
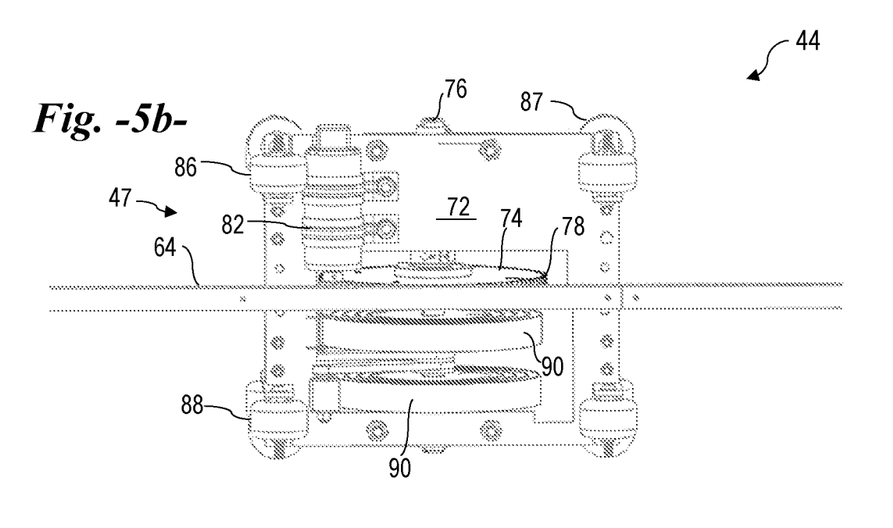
FIG. 5b is a bottom view of the spring mass damper of FIG. 4.
Figure 5C:
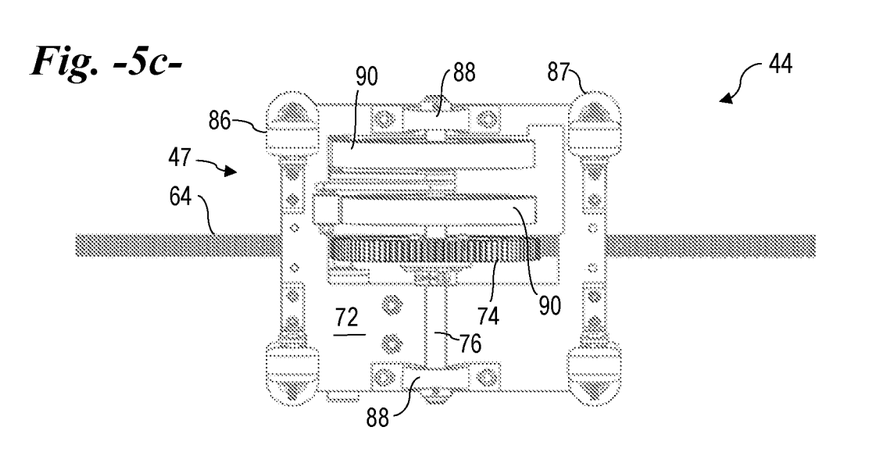
FIG. 5c is a top view of the spring mass damper of FIG. 4.

Referring to the perspective view of FIG. 4 and the various views of FIGS. 5a-5c and 6, an embodiment of a spring mass damper 44 in accordance with aspects of the invention is provided. The spring mass damper 44 is configured to reduce vibrations and loads in rotor blades during a non-operational mode of the wind turbine wherein the rotor hub is in a locked or idling condition. The spring mass damper 44 is mounted to at least one, and preferably all, of the rotor blades (as discussed above) before or shortly after placing the wind turbine in the non-operational mode or during installation of the wind turbine. The spring mass damper 44 is tunable (amplitude/stroke length and frequency) to an excitation frequency of the respective rotor blade or system frequencies as operating conditions experienced by the wind turbine change during the locked or idling condition, as explained in greater detail below.

Figure 7:
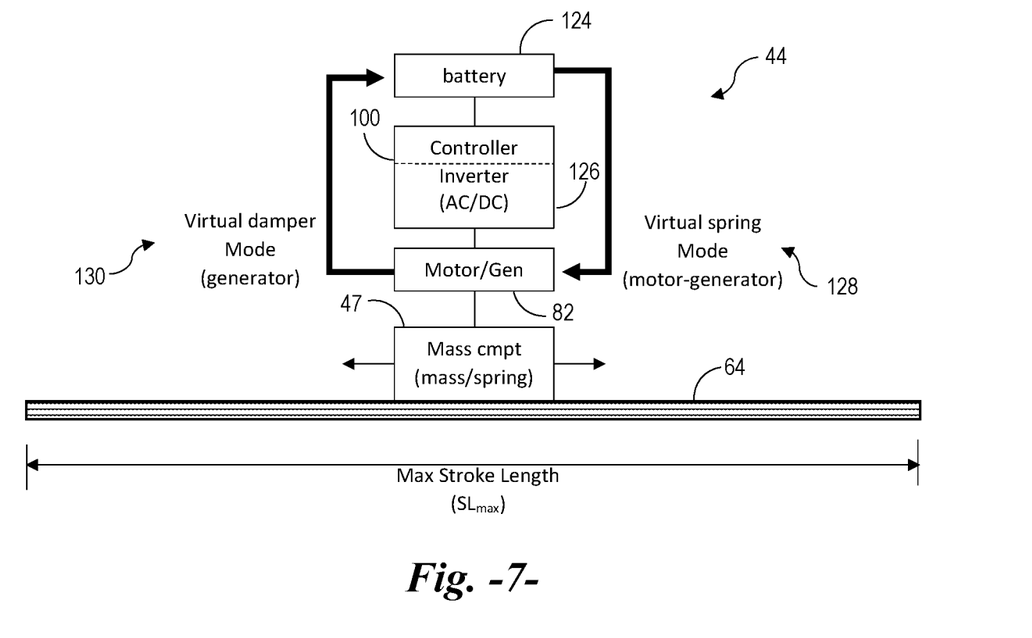
FIG. 7 is a control hardware diagram for a tunable spring mass damper.

The spring mass damper 44 includes a mass component 47 that moves along a stroke path within the spring mass damper 44. The term "mass component" is used herein to collectively refer to a mass of the totality of the components on a frame 72 (and is inclusive of the frame 72) that move along a track 64 within the spring mass damper 44, as described in more detail below. The track 64 defines a maximum stroke length of the stroke path, as depicted in FIG. 7.

The illustrated embodiment of the spring mass damper 44 includes a flywheel 74 that is in geared engagement with an electrical machine 80. The spring mass damper is tuned by controlling and changing a force exerted on the mass component 47 by the electrical machine 80 as the mass component 47 moves back-and-forth along the stroke path defined by the track 64, as discussed in greater detail below. This tuning function is accomplished automatically and wholly by the spring mass damper 44 via an internal electronic controller 100 (FIGS. 6 and 7) at any time the spring mass damper 44 is mounted to a rotor blade 22. Thus, as environmental or operating conditions experienced by the wind turbine change during the non-operational mode resulting in a change in vibrations or oscillations induced in the blades, the spring mass damper 44 is effectively and automatically tuned to the change in the vibrations or oscillations.

The flywheel 74 is rotationally configured on a frame 72 that moves linearly along the chord-wise stroke path within the housing 54 relative to the rotor blade 22. The flywheel 74 is coupled to a shaft 76 that is supported for rotation by bearings 88. The flywheel 74 is in geared engagement with the first track gear 64 that may be mounted to the base 56, as particularly seen in FIG. 4. The track gear 64 extends longitudinally along the base 56 and effectively defines a stroke length of the path within the spring mass damper 44. The flywheel 74 has a geared outer circumferential surface 78 that meshes with the track gear 64. Thus, edgewise vibrations or oscillations induced in the rotor blade cause the flywheel 74 to rotate as the mass component moves linearly back-and-forth along the track gear 64.

Although not illustrated in the figures, the flywheel 74 may also be in geared engagement with a second track gear mounted to an underside of the top 60 of the housing 54.

In the depicted embodiment, the flywheel 74 is geared directly to the track gear 64 (which may include an additional upper track gear). It should be appreciated that an intermediate gear may be used between the flywheel 74 and the track gear 64.

Figure 6:
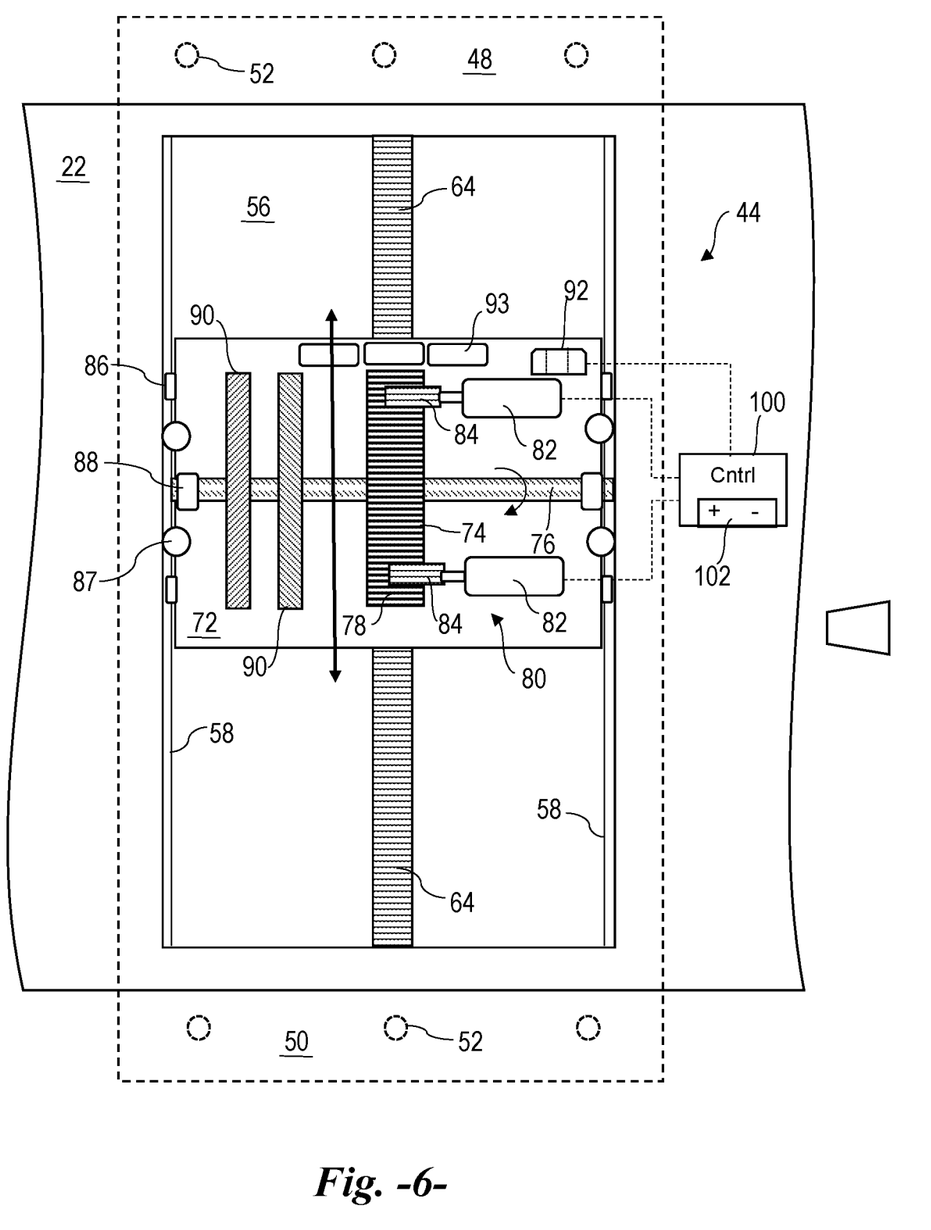
FIG. 6 is a top diagram view of an alternative embodiment of a tunable spring mass damper.

In addition to the weight of the components on (and including) the frame 72, the mass component 47 may also include additional ballast weights 93 that can be added to or removed from the frame 72, as depicted in the embodiment of FIG. 6.

The frame 72 may include a number of rollers 86 fixed thereto that ride along bottom runners 58 mounted on (or formed integral with) the base 56 and top runners 62 supported by or formed on the top 60 of the housing 56. Side rollers 87 may be mounted on the frame 72 to roll along the side walls 68 of the housing 54. Thus, the frame 72 may be supported for direct rolling engagement with the housing 54 and base 56 via the rollers 86, 87.

Oppositely acting torsion springs 90 are provided to oppose the back-and-forth motion of the frame 72 (and attached components) relative to the track gears 64, 66, which also results in dampening of the blade vibrations and oscillations. One end of each spring 90 is fixed to the frame 72 and the other end of the spring 90 is fixed to the shaft 76. Thus, as the shaft 76 rotates in either direction, it "tightens" one of the torsion springs 90 to generate an opposing force against rotations of the shaft 76 (and thus rotation of the flywheel 74 fixed to the shaft 76). When the mass component 47 reverses direction on the track 64, the spring 90 starts to "unwind" and thus provides an acceleration force to the mass component 47 towards the opposite end of the track 64. The damping and acceleration forces of the spring 90 are a function of the "stiffness" of the spring (i.e., the spring constant (k)).

The electrical machine 80 is mounted on the frame 72 and is in geared engagement (direct or indirect) with the flywheel 74. For example, the electrical machine 80 may be in direct geared engagement with the outer circumferential surface 78 of the flywheel 74. In the depicted embodiment, the electrical machine is driven by a gear 84 that is also in engagement with the outer circumferential surface 78 of the flywheel 74.

In a particular embodiment depicted in the figures, the electrical machine 80 is a motor-generator 82. More particularly, the motor-generator 82 may be a DC motor that operates in a motor mode or a generator mode depending on depending on current flow through the machine. A suitable DC motor for this application is the RE 50 DC motor (200 watt) from Maxon Motors. The motor-generator 82 is in geared engagement with (direct or indirect) and driven by the flywheel 74.

Operating principles of the electrical machine 80 (motor-generator 82) are explained with reference to FIG. 7. The theory of operation of the electrical machine 80 is similar to that of a regenerative brake system, which is known and understood by those skilled in the art. The mass component 47 of the spring mass damper 44 moves back-and-forth in a stroke path along the track 64 as the rotor blade vibrates or oscillates. The stroke path has a maximum length ($SL_{max}$) defined by the length of the track 64. The length of the stroke path corresponds to the amplitude of the blade vibrations, whereas the frequency of the back-and-forth motion of the mass component 47 correspond to the vibration frequency of the blade. The mass component 47 decelerates as it approaches the end of its stroke path. This deceleration causes the motor to "overspeed" and become a generator, wherein energy generated by the generator is stored in a battery 124 (i.e., current generated by the generator charges the battery 124). The spring mass damper 44 takes advantage of this generator aspect of the electrical machine in a "virtual damper mode" 130 of operation.

It is a characteristic of electric generators that current from the generator produces a reaction torque (counter-torque) that, at a given load on the generator (e.g., the battery), is proportional to the magnitude of the current. Torque control of the generator works by changing the effective load placed on the generator (e.g., in this case, the charging rate of the battery). A higher charging rate on the battery corresponds to more current from the generator and proportionally more counter-torque/damping capability of the spring mass damper 44. Likewise, a lower charging rate corresponds to less current from the generator and proportionally lower counter-torque/damping capability of the spring mass damper 44. Controlling the component of generator current proportional to spring mass damper velocity effectively and automatically tunes the damping of the spring mass damper 44. This principle is utilized in the present invention to provide a remote electrical tuning damper capability to the spring mass damper 44 (i.e., the virtual damper 130).

Still referring to FIG. 6, the mass component 47 has an effective stroke length in the chord-wise direction across the blade, wherein blade vibrations or oscillations of relatively lower amplitude result in a shorter stroke (shorter path of travel of the frame 72 on the track gear 64) and vibrations or oscillations of relatively greater amplitude result in a longer stroke of the mass component 47. Tuning the spring mass damper 44 to the stroke length is accomplished by controlling the motor-generator 82 in the virtual damper mode 130, as discussed above. Tuning of the device to limit the travel (i.e., stroke length) at higher vibration/oscillation amplitudes is an important safety feature so that travel of the mass component 47 does not exceed the maximum stroke path/length defined by the track 64 in the spring mass damper 44. On the other hand, it is desirable to tune the spring mass damper 44 to maximize its performance at lower amplitudes. Thus, the tuning scheme aims to increase stroke at lower amplitudes to maximize performance of the spring mass damper 44, while limiting stroke at higher amplitudes to avoid damage to the spring mass damper 44. Thus, depending on the amplitude of the vibrations/oscillations induced in the rotor blade by the operating conditions experienced by the wind turbine, a desired stroke length is set or defined for the spring mass damper 44 to reduce the vibration amplitude.

The mass component 47 (including the springs 90) are selected such that the resonant frequency of the spring mass damper 44 is "hard-wired" to the expected VIV frequency of the wind turbine blade 22. However, the VIV effect can appear with varying intensity and resonant frequency depending on the strength and direction of wind gusts. Thus, automatic adjustment of the spring mass damper to varying VIV frequencies is desirable and provided by the present spring mass damper 44.

Still referring to FIG. 7, when the mass component 47 stops and reverses direction at the ends of the stroke path, the physical spring pulls the mass back to the center of the spring mass damper, releasing stored energy. Furthermore, as the mass passes the center of the spring mass damper, the spring provides a restoring force that stores the kinetic energy of the mass. This spring behavior can be replicated by the electrical machine and battery. When the mass component stops and reverses direction, the electrical machine can act as a motor accelerating the mass. Conversely, when the mass component passes the center of the spring mass damper, the electrical machine changes to a generator mode, absorbing the energy of the mass. This effect is created by controlling the component of current in the electrical machine proportional to spring mass damper position. Ideally there is no net exchange of energy between the electrical machine and the mass component, similar to a physical spring; in a practical system, electrical losses that occur due to the currents are sourced from the battery or from the "virtual damper mode". The spring mass damper 44 takes advantage of this motor-generator aspect of the electrical machine 80 in a "virtual spring mode" 128 of operation. By controlling this virtual spring mode 128, the spring mass damper 44 can be electronically and automatically tuned to whatever resonant frequency of the blade vibrations is excited by the VIV.

It should be appreciated that the electrical machine 80 can simultaneously operate in the virtual damper mode 130, wherein energy is generated and stored in the battery 124, and the virtual spring mode 128, wherein the energy is charged and discharged from the battery 124.

As reflected in FIG. 7, control of the motor generator in the virtual damper mode 130 and virtual spring mode 128 is via the controller 100 and inverter 126, wherein the inverter 126 converts DC power from the battery to AC power during motoring operation and converts AC power from the generator to DC power stored by the battery 124 during generator mode of operation 130.

Figure 8:
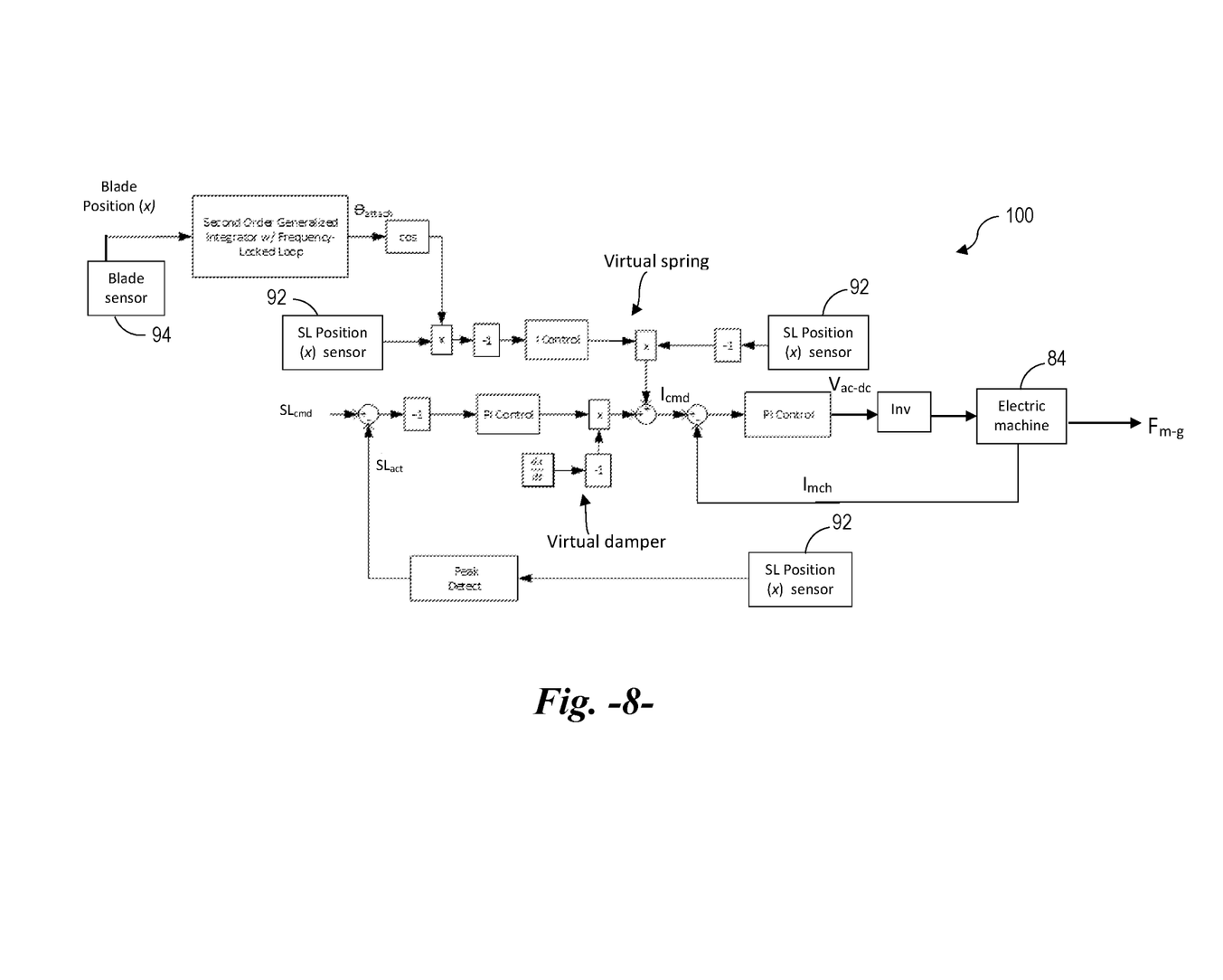
FIG. 8 is a control diagram for a tunable spring mass damper.

FIG. 8 depicts an embodiment for tuning the spring mass damper 44 in the virtual damper mode 130 and the virtual spring mode 128. The tuning functions may be performed by the controller 100 discussed above.

In the virtual damper component of FIG. 8, as discussed, an objective of the tunable damping is to tune the stroke length of the mass component to the vibration amplitude and to ensure that the displacement of the mechanism along the stroke path never exceeds the commanded stroke length ($SL_{cmd}$) corresponding to the physical stroke length between the ends of the track gear 64 (FIG. 7). One or more sensors 92 (discussed below) determine the position (x) of the mass component 47 along the track 64 and the actual peak amplitude of the mass component 47 is computed and compared to the commanded stroke length ($SL_{cmd}$) to generate an error signal that is assigned a negative value and conveyed to the proportional-integrator control (PI control). The signal from the PI control is multiplied by the mechanism velocity, in effect making the output from the PI control an electronically controlled damping parameter passed to the summing junction. The damping is thus tuned until the desired mechanism displacement is achieved.

In the virtual spring component of FIG. 8, an electronic spring is essentially created by adapting and multiplying a virtual spring stiffness by position of the mass component. The control objective of the virtual spring tuning is to ensure that the resonant frequency of the mechanism matches the active VIV blade frequency. To detect this condition, the position (x) of the mass component relative to the blade is measured by the sensor 92 from which the frequency of the mass component 47 is determined. The spatial position of acceleration of the blade is measured by a blade sensor 94 (e.g., an accelerometer) from which the blade frequency is determined. The frequencies of the blade and the mass component are aligned when an exactly ninety-degree phase shift exists from the blade acceleration to the mass component displacement. An alternate way of viewing this statement is that, if the blade acceleration signal is all in the "Real" axis (cosine), then at the resonant frequency the mass component displacement should appear all in the "Imaginary" axis (sine). This implies that any cosine component of the mass component displacement will be zero at this condition. In effect, the virtual spring stiffness is adjusted by an integral (I) control until this condition is achieved. To detect this condition, a tracking signal ($\theta_{attach}$) aligned to the blade acceleration is synthesized using a single phase Second Order Generalized Integrator algorithm with an embedded Frequency-Locked Loop. A cosine is generated from this tracking signal, multiplied by the position (x) of the mass component, and pushed to an I control. This algorithm acts as a gradient-descent Cosine Transform that adapts the virtual spring parameter until the "Real" component of x is driven to zero, at which point the spring mass damper resonant frequency is tuned to the VIV blade frequency.

The signal from I control is multiplied by a negative value of the position (x) of the mass component and passed to the summing junction and combined with the damping parameter signal discussed above to generate a current command signal ($I_{cmd}$) that is passed to a current control function. This current control provides closed loop proportional-integral (PI) control of the electrical machine windings through the power electronic inverter 126 (FIG. 7) with current sensor feedback, where $V_{ac-dc}$ represents the commanded voltage from the control 100 that is implemented by the inverter for control of the electrical machine in the virtual damper mode 130 and virtual spring mode 128.

In the embodiment of the spring mass damper 44 depicted in FIGS. 4 and 5a-5c, a single electrical machine 82 is utilized to provide the tunable capability. It should be appreciated that that a plurality of the electrical machines 82 may be utilized to achieve a desired tuning capability within the constraints of available space on the frame 72. For example, in the embodiment depicted in FIG. 6, two electrical machines 82 are engaged with the flywheel 74, with both electrical machines 82 in communication with a common controller 100.

The controller 100 may be a dedicated onboard component of the spring mass damper 44. The controller 100 may have a dedicated power supply, such as the rechargeable battery 102, or in an alternate embodiment may be supplied with power from a source in the wind turbine.

Referring to FIG. 6, a sensor array 92 is provided on the frame 72 and is in communication with the controller 100. This array 92 may include one or more sensors. In a particular embodiment, three local sensors are configured in the array 92.

The first local sensor in the array 92 may be a position sensor configured to sense the instantaneous position of the mass component 47 along the track 64 to determine the current operating state of the spring mass damper 44. This is the main sensor used to provide feedback for the controller 100 for the tuning functions discussed above. This first sensor may be, for example, an incremental rotary encoder.

The second local sensor in the array 92 may be a neutral position sensor configured to provide a pulse (or other indication) at the neutral position of the mass component 47 corresponding to the middle of the stroke path. This sensor may be used as a check to ensure that the first sensor (e.g., encoder) is aligned correctly. If the encoder does not agree with the neutral position sensor, the encoder is reset to ensure a correct neutral position. This second sensor may be, for example, an inductive or hall effect sensor on the moving frame 72, and a magnet on the base 56. When the sensor travels over the magnet, a pulse is generated.

The third local sensor in the array 92 may be a limit position sensor, such as an inductive/hall effect sensor. This sensor is located on the mass component 47 (e.g., on the frame 72) in a way that does not respond to the neutral position sensor. The magnets for this third sensor are placed at the limits of the stroke path/length. If a pulse is detected from this sensor, action is taken to maximize the generator torque damping effect to oppose the motion because the moving frame is in danger of exceeding its design stroke.

The controller 100 may be in communication with a remotely located central controller 112 (directly or via the wind turbine controller 24) for receipt or exchange of control commands or data therewith. For example, the central controller 112 may generate control commands to change certain operating parameters of the spring mass damper 44, such as the stroke length, response characteristics of the spring mass damper, power modes, etc. The controller 100 may be in communication with a mobile hand-held controller 116 (e.g., a mobile smart device) directly or via an intermediary controller. The mobile controller 116 may run an application that allows an operator to monitor operation of the spring mass damper 44 and/or control the operating parameters thereof. In the depicted embodiment, the mobile controller 116 and the central controller 112 may be in direct communication with the spring mass damper controller 100 via a wireless network 120. The spring mass damper 44 would, in this case, also include wireless transmission and reception capability.

Figure 9:
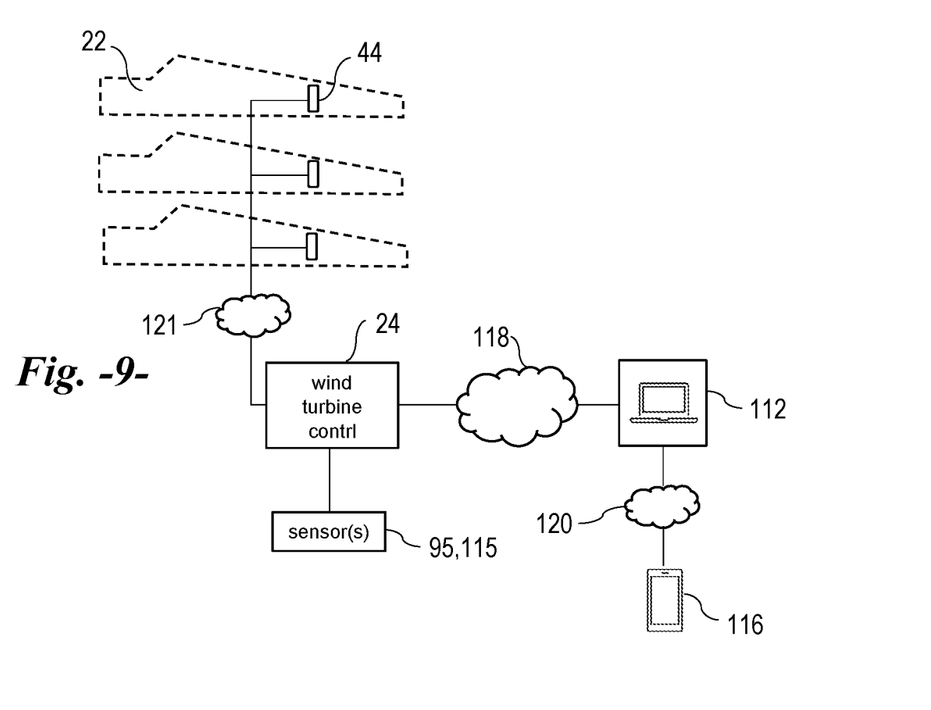
FIG. 9 is a control hardware diagram for a wind turbine utilizing multiple tunable spring mass dampers.

FIG. 9 also depicts a control scheme wherein each rotor blade 22 of the wind turbine has one of the spring mass dampers 44 mounted thereon. Each damper 44 may have its own dedicated controller 100 in communication with the wind turbine controller 24 via a wireless network 121 or a wired connection. The wind turbine controller 24 may, in turn, be in communication with the central controller 112 via a wireless network 118. The mobile smart device 116 may be in direct communication with the wind turbine controller 24 or via the central controller 112 (and wireless network 120).

It should be appreciated that various control schemes and architecture may be utilized to provide the automatic tuning capability for the spring mass dampers 44 on the rotor blades 22 and remote adjustment or monitoring of the operating state or parameters of the spring mass dampers 44.

In certain embodiments, one or more sensors 95, 115 located on the blades 22 or other static locations of the wind turbine may be utilized to provide data indicative of vibrations or oscillations induced in the rotor blades during the locked or idling state of the rotor 18. The oscillations or vibrations may be detected or measured directly by displacement sensors 95 (e.g., accelerometers or strain gauges) located directly on the rotor blades. A vibration of a blade may be determined when the strain or deformation parameter satisfies a strain or deformation threshold, which may be determined by the controller 100 (or any of the other controllers 112, 116).

The sensors 95, 115 may be in communication with the central controller 112 directly or via the wind turbine controller 24, as depicted in FIG. 9. In order to conserve the internal power supply (e.g., battery 102) in the spring mass dampers 44, it may be desired that the devices 44 are placed in a low-power sleep mode until the vibrations or oscillations induced in the blades reaches a threshold level as determined by the central controller 112 based on the data from the sensors 95, 115. Once this threshold is met, the central controller 112 may issue a "turn on" command to the spring mass dampers 44 directly or via the wind turbine controller 24.

Alternatively, the oscillations or vibrations may be predicted or inferred based on data from sensors disposed on the wind turbine to measure wind speed, wind direction, yaw position of the rotor hub, etc. For this, the wind turbine may include one or more wind parameter sensors 115 (FIG. 1) for measuring various wind parameters upwind of the wind turbine. The actual wind parameter(s) may be any one or combination of the following: wind gust, wind speed, wind direction, wind acceleration, wind turbulence, wind shear, wind veer, wake, wind up-flow, or similar. Further, the one or more sensors 115 may include at least one LIDAR sensor for measuring upwind parameters. The LIDAR sensors may be located on the wind turbine tower 12, on one or more of the wind turbine blades 22, on the nacelle 16, on a meteorological mast of the wind turbine, or at any other suitable location. In still further embodiments, the wind parameter sensor 115 may be located in any suitable location near the wind turbine 10. The sensors 115 may be configured to measure a wind parameter ahead of at least one specific portion, typically the most significant sections of the blades 22 in terms of contributions of those sections to aerodynamic torque on the blades 22. These sections may include, for example, sections close to the tip of the blade.

Further aspects of the invention are provided by the subject matter of the following clauses:

Clause 1. A method for reducing vibrations and loads in a blade on a rotor hub of a wind turbine when the rotor hub is in a locked or idling condition, the method comprising: attaching an electronically tunable spring mass damper at a fixed location on the blade during the locked or idling condition of the rotor hub, the tunable spring mass damper having a mass component that moves along a stroke path; the spring mass damper including an electric machine operable as a motor or a generator; determining an amplitude and a frequency of vibrations induced in the blade during the locked or idling condition; sensing movement of the mass component resulting from the vibrations induced in the blade; and based on the sensed movement of the mass component, performing one or both of (a) automatically tuning the spring mass damper to the amplitude of the vibrations by operating the electric machine as a generator in a virtual damper mode; or (b) automatically tuning the spring mass damper to the frequency of the vibrations by operating the electrical machine as a motor-generator in a virtual spring mode.

Clause 2: The method according to clause 1, comprising performing both of (a) and (b), wherein the spring mass damper includes a flywheel in geared engagement with the electric machine as the mass component moves along the stroke path, wherein in the virtual damper mode the electrical machine generates a counter-torque on the flywheel as the spring mass damper approaches and decelerates at ends of the stroke path, and in the virtual spring mode the electrical machine generates an additive or counter-torque on the flywheel as the spring mass damper accelerates towards or away from the ends of the stroke path.

Clause 3: The method according to clause 1 or 2, wherein in the virtual damper mode, the electrical machine operating as the generator charges a battery, and in the virtual spring mode, the electrical machine operating as the motor-generator is powered by the battery.

Clause 4: The method according to any one of clauses 1-3, wherein the flywheel is in geared engagement with a track gear that extends along the stroke path such that the flywheel is rotationally driven as the mass component moves along the stroke path, the flywheel coupled to a shaft that is coupled to the electrical machine.

Clause 5: The method according to any one of clauses 1-4, wherein the step of automatically tuning the spring mass damper is accomplished completely by the spring mass damper without outside operator or device action.

Clause 6: The method according to any one of clauses 1-5, wherein position or movement of the mass component along the stroke path is sensed continuously or periodically with one or more sensors configured with the spring mass damper.

Clause 7: The method according to any one of clauses 1-6, wherein the spring mass damper is operationally insensitive to temperature changes.

Clause 8: The method according to any one of clauses 1-7, wherein the spring mass damper is in communication with a remote central controller, wherein at least one operational parameter of the spring mass damper is remotely adjusted by the remote central controller.

Clause 9: The method according to any one of clauses 1-8, wherein the spring mass damper is also in communication with a mobile smart device that is in communication with the remote central controller, wherein an operator adjusts the operating parameters of the spring mass damper via the mobile smart device or via the remote central controller.

Clause 10: The method according to any one of clauses 1-9, wherein each blade on the rotor hub is configured with one of the spring mass dampers, each of the spring mass dampers is in communication with a wind turbine controller, the wind turbine controller in communication with the remote central controller.

Clause 11: A wind turbine configured for reducing vibrations and loads in rotor blades during a non-operational mode of the wind turbine, comprising: a plurality of rotor blades on a rotor hub; in the non-operational mode of the wind turbine with the rotor hub in a locked or idling condition, the wind turbine further comprising a tunable spring mass damper attached at a fixed location on one or more of the rotor blades, the spring mass damper comprising a mass component that is movable along a stroke path; one or more sensors configured with the spring mass damper to sense movement of the mass component along the stroke path, wherein the movement is generated by vibrations or oscillations induced in the rotor blades during the locked or idling condition of the rotor hub; the spring mass damper comprising an electric machine operable as a motor or a generator; and a controller configured with the spring mass damper and configured to perform one or both of the following: (a) based on the sensed movement of the mass component, automatically tune the spring mass damper to an amplitude of the vibrations by operating the electric machine as a generator in a virtual damper mode; or (b) automatically tune the spring mass damper to the frequency of the vibrations by operating the electrical machine as a motor-generator in a virtual spring mode.

Clause 12: The wind turbine according to clause 11, wherein the spring mass damper is in communication with a remote central controller, wherein one or more operating parameters of the spring mass damper are remotely adjusted by the remote central controller.

Clause 13: The wind turbine according to one of clauses 11-12, wherein the spring mass damper is also in communication with a mobile smart device, wherein an operator adjusts the operating parameters of the spring mass damper via the mobile smart device or via the remote central controller.

Clause 14: The wind turbine according to any one of clauses 11-13, wherein each of the rotor blades is configured with one of the spring mass dampers, each of the spring mass dampers in communication with a wind turbine controller, the wind turbine controller in communication with the remote central controller.

Clause 15: The wind turbine according to an one of clauses 11-14, wherein the spring mass damper includes a flywheel in geared engagement with the electric machine as the mass component moves along the stroke path, wherein in the virtual damper mode the electrical machine generates a counter-torque to the flywheel as the spring mass damper decelerates towards ends of the stroke path, and in the virtual spring mode the electrical machine generates an additive or counter-torque to the flywheel as the spring mass damper accelerates towards or away from the ends of the stroke path.

Clause 16: The wind turbine according to any one of clauses 11-15, wherein the flywheel is in geared engagement with a track gear that extends along the stroke path such that the flywheel is rotationally driven as the mass component moves along the stroke path, the flywheel coupled to a shaft that is coupled to the electrical machine.

Clause 17: The wind turbine according to any one of clauses 11-16, wherein the spring mass damper further comprises a battery, wherein in the virtual damper mode, the electrical machine operates as the generator and charges the battery, and in the virtual spring mode, the electrical machine operates as the motor-generator and is powered by the battery.

Clause 18: A system for reducing vibrations and loads in rotor blades of a wind turbine during a non-operational mode of the wind turbine wherein a rotor hub of the wind turbine is in a locked or idling condition, the system comprising: a tunable spring mass damper configured for attachment at a fixed location on one or more of the rotor blades, the spring mass damper comprising a mass component that is movable along a stroke path; one or more sensors configured with the spring mass damper to sense movement of the mass component along the stroke path, wherein the movement is generated by vibrations or oscillations induced in the rotor blades during the locked or idling condition of the rotor hub; the spring mass damper comprising an electric machine operable as a motor or a generator; and a controller configured with the spring mass damper and configured to perform one or both of the following: (a) based on the sensed movement of the mass component, automatically tune the spring mass damper to an amplitude of the vibrations by operating the electric machine as a generator in a virtual damper mode; or (b) automatically tune the spring mass damper to the frequency of the vibrations by operating the electrical machine as a motor-generator in a virtual spring mode.

Clause 19: The system according to clause 18, wherein the spring mass damper includes a flywheel in geared engagement with the electric machine as the mass component moves along the stroke path, wherein in the virtual damper mode the electrical machine generates a counter-torque to the flywheel as the spring mass damper decelerates towards ends of the stroke path, and in the virtual spring mode the electrical machine generates an additive or counter-torque to the flywheel as the spring mass damper accelerates towards or away from the ends of the stroke path, and wherein the flywheel is in geared engagement with a track gear that extends along the stroke path such that the flywheel is rotationally driven as the mass component moves along the stroke path, the flywheel coupled to a shaft that is coupled to the electrical machine.

Clause 20: The system according to any one of clauses 18-19, wherein the spring mass damper further comprises a battery, wherein in the virtual damper mode, the electrical machine operates as the generator and charges the battery, and in the virtual spring mode, the electrical machine operates as the motor-generator and is powered by the battery.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for reducing vibrations and loads in a blade on a rotor hub of a wind turbine when the rotor hub is in a locked or idling condition, the method comprising:
    attaching an electronically tunable spring mass damper at a fixed location on the blade during the locked or idling condition of the rotor hub, the tunable spring mass damper having a mass component that moves along a stroke path;
    the spring mass damper including an electric machine operable as a motor or a generator;
    determining an amplitude and a frequency of vibrations induced in the blade during the locked or idling condition;
    sensing movement of the mass component resulting from the vibrations induced in the blade; and
    based on the sensed movement of the mass component, performing one or both of: (a) automatically tuning the spring mass damper to the amplitude of the vibrations by operating the electric machine as a generator in a virtual damper mode; or (b) automatically tuning the spring mass damper to the frequency of the vibrations by operating the electrical machine as a motor-generator in a virtual spring mode.

2. The method according to claim 1, comprising performing both of (a) and (b), wherein the spring mass damper includes a flywheel in geared engagement with the electric machine as the mass component moves along the stroke path, wherein in the virtual damper mode the electrical machine generates a counter-torque on the flywheel as the spring mass damper approaches and decelerates at ends of the stroke path, and in the virtual spring mode the electrical machine generates an additive or counter-torque on the flywheel as the spring mass damper accelerates away from the ends of the stroke path.

3. The method according to claim 2, wherein in the virtual damper mode, the electrical machine operating as the generator charges a battery, and in the virtual spring mode, the electrical machine operating as the motor-generator is powered by the battery.

4. The method according to claim 2, wherein the flywheel is in geared engagement with a track gear that extends along the stroke path such that the flywheel is rotationally driven as the mass component moves along the stroke path, the flywheel coupled to a shaft that is coupled to the electrical machine.

5. The method according to claim 1, wherein the step of automatically tuning the spring mass damper is accomplished completely by the spring mass damper without outside operator or device action.

6. The method according to claim 1, wherein position or movement of the mass component along the stroke path is sensed continuously or periodically with one or more sensors configured with the spring mass damper.

7. The method according to claim 1, wherein the spring mass damper is operationally insensitive to temperature changes.

8. The method according to claim 1, wherein the spring mass damper is in communication with a remote central controller, wherein at least one operational parameter of the spring mass damper is remotely adjusted by the remote central controller.

9. The method according to claim 8, wherein the spring mass damper is also in communication with a mobile smart device that is in communication with the remote central controller, wherein an operator adjusts the operating parameters of the spring mass damper via the mobile smart device or via the remote central controller.

10. The method according to claim 8, wherein each blade on the rotor hub is configured with one of the spring mass dampers, each of the spring mass dampers in communication with a wind turbine controller, the wind turbine controller in communication with the remote central controller.

11. A wind turbine configured for reducing vibrations and loads in rotor blades during a non-operational mode of the wind turbine, comprising:
a plurality of rotor blades on a rotor hub;
in the non-operational mode of the wind turbine with the rotor hub in a locked or idling condition, the wind turbine further comprising a tunable spring mass damper attached at a fixed location on one or more of the rotor blades, the spring mass damper comprising a mass component that is movable along a stroke path;
one or more sensors configured with the spring mass damper to sense movement of the mass component along the stroke path, wherein the movement is generated by vibrations or oscillations induced in the rotor blades during the locked or idling condition of the rotor hub;
the spring mass damper comprising an electric machine operable as a motor or a generator; and
a controller configured with the spring mass damper and configured to perform one or both of the following: (a) based on the sensed movement of the mass component, automatically tune the spring mass damper to an amplitude of the vibrations by operating the electric machine as a generator in a virtual damper mode; or (b) automatically tune the spring mass damper to the frequency of the vibrations by operating the electrical machine as a motor-generator in a virtual spring mode.

12. The wind turbine according to claim 11, wherein the spring mass damper is in communication with a remote central controller, wherein one or more operating parameters of the spring mass damper are remotely adjusted by the remote central controller.

13. The wind turbine according to claim 12, wherein the spring mass damper is also in communication with a mobile smart device, wherein an operator adjusts the operating parameters of the spring mass damper via the mobile smart device or via the remote central controller.

14. The wind turbine according to claim 11, wherein each of the rotor blades is configured with one of the spring mass dampers, each of the spring mass dampers in communication with a wind turbine controller, the wind turbine controller in communication with the remote central controller.

15. The wind turbine according to claim 11, wherein the spring mass damper includes a flywheel in geared engagement with the electric machine as the mass component moves along the stroke path, wherein in the virtual damper mode the electrical machine generates a counter-torque to the flywheel as the spring mass damper decelerates towards ends of the stroke path, and in the virtual spring mode the electrical machine generates an additive or counter-torque to the flywheel as the spring mass damper accelerates towards or away from the ends of the stroke path.

16. The wind turbine according to claim 15, wherein the flywheel is in geared engagement with a track gear that extends along the stroke path such that the flywheel is rotationally driven as the mass component moves along the stroke path, the flywheel coupled to a shaft that is coupled to the electrical machine.

17. The wind turbine according to claim 11, wherein the spring mass damper further comprises a battery, wherein in the virtual damper mode, the electrical machine operates as the generator and charges the battery, and in the virtual spring mode, the electrical machine operates as the motor-generator and is powered by the battery.

18. A system for reducing vibrations and loads in rotor blades of a wind turbine during a non-operational mode of the wind turbine wherein a rotor hub of the wind turbine is in a locked or idling condition, the system comprising:
a tunable spring mass damper configured for attachment at a fixed location on one or more of the rotor blades, the spring mass damper comprising a mass component that is movable along a stroke path;
one or more sensors configured with the spring mass damper to sense movement of the mass component along the stroke path, wherein the movement is generated by vibrations or oscillations induced in the rotor blades during the locked or idling condition of the rotor hub;
the spring mass damper comprising an electric machine operable as a motor or a generator; and
a controller configured with the spring mass damper and configured to perform one or both of the following: (a) based on the sensed movement of the mass component, automatically tune the spring mass damper to an amplitude of the vibrations by operating the electric machine as a generator in a virtual damper mode; or (b) automatically tune the spring mass damper to the frequency of the vibrations by operating the electrical machine as a motor-generator in a virtual spring mode.

19. The system according to claim 18, wherein the spring mass damper includes a flywheel in geared engagement with the electric machine as the mass component moves along the stroke path, wherein in the virtual damper mode the electrical machine generates a counter-torque to the flywheel as the spring mass damper decelerates towards ends of the stroke path, and in the virtual spring mode the electrical machine generates an additive or counter-torque to the flywheel as the spring mass damper accelerates towards or away from the ends of the stroke path, and wherein the flywheel is in geared engagement with a track gear that extends along the stroke path such that the flywheel is rotationally driven as the mass component moves along the stroke path, the flywheel coupled to a shaft that is coupled to the electrical machine.

20. The system according to claim 18, wherein the spring mass damper further comprises a battery, wherein in the virtual damper mode, the electrical machine operates as the generator and charges the battery, and in the virtual spring mode, the electrical machine operates as the motor-generator and is powered by the battery.

* * * * *